United States Patent [19]

Covino-Hrbacek

[11] Patent Number: 5,262,362

[45] Date of Patent: Nov. 16, 1993

[54] COATINGS FOR SIO₂ OPTICAL FIBERS

[75] Inventor: Josephine Covino-Hrbacek, Ridgecrest, Calif.

[73] Assignee: The United States of America as represented by the Secretary of the Navy, Washington, D.C.

[21] Appl. No.: 901,649

[22] Filed: Jun. 22, 1992

[51] Int. Cl.⁵ .............................................. C03C 3/00
[52] U.S. Cl. ................................... 501/12; 106/287.1; 106/287.19; 427/167
[58] Field of Search ................. 501/12, 38; 106/287.1, 106/287.12, 287.17, 287.19; 427/167

[56] References Cited

U.S. PATENT DOCUMENTS

| | | | |
|---|---|---|---|
| 4,975,102 | 12/1990 | Edahiro et al. | 65/3.12 |
| 5,049,338 | 9/1991 | Varaprasad et al. | 264/183 |
| 5,068,208 | 11/1991 | Haun et al. | 501/12 |
| 5,123,940 | 6/1992 | Di Giovanni et al. | 65/3.12 |

*Primary Examiner*—Karl Group
*Assistant Examiner*—A. Wright
*Attorney, Agent, or Firm*—Harvey A. Gilbert; Melvin J. Sliwka; John L. Forrest, Jr.

[57] ABSTRACT

A chemical coating consisting of a mixture of tetraethoxysilane (TEOS), $Al(OC_4H_9)_3$, LiOH, $Ti(OC_3H_7)_4$, $Zr( )_2C_5H_7)_4$, $HNO_3$ for pH control, and glycerol which produces an environmentally protective barrier resistant to cracking or crazing to a glass fiber to which it is applied by the SOL-GEL process.

6 Claims, No Drawings

COATINGS FOR SIO₂ OPTICAL FIBERS

FIELD OF THE INVENTION

The present invention relates to coatings for optical fibers and in particular to protective coatings produced and applied using the Sol-Gel process.

BACKGROUND OF THE INVENTION

Coatings for optical fibers which offer protection against moisture and high temperature as well as resistance against salt water, harsh chemical environments, such as acidic or basic, while providing coating continuity and resistance to cracking and crack propagation are difficult to achieve.

The prior art has focused around organic coatings such as ultraviolet (UV) acrylates and Chemical Vapor Deposition (CVD) of, for example, TiC. In the case of acrylates, these coatings are not stable at temperatures above 200° C. and their hermaticity is low to nonexisting even at room temperatures. Application of ceramic coatings using chemical vapor deposition (CVD) are very limited in their chemical composition. Usually these coatings are simple ceramics such as TiC, $SiO_2$, and $Si_3N_4$, for example. Application of multi-function compounds is at best difficult and must be performed in more than one step. In other words, if a $Si_3N_4$-$SiO_2$-TiC coating is desired, three distinct steps are required and three distinct CVD systems must be utilized. These multifunction applications are thus very expensive and complex.

SUMMARY OF THE INVENTION

It is thus an object of the present invention to provide a chemical mixture that can be applied to an optical fiber to produce a highly adherent, non-flaking and crack-free coating.

It is yet another object of the present invention to provide a chemical mixture that can be applied to an optical glass fiber to produce a crack-free, crack-resistant, and crack propagation-resistant environmental protective coating having high hermaticity using the SOL-GEL application technique.

It is still another object of the present invention to provide an optical fiber coating capable of withstanding prolonged exposure at temperatures of 200° C. or greater.

It is yet another object of the present invention to provide an optical fiber coating that does not exhibit wide swings of thermal expansion as a function of temperature. It is further an object of the present invention to provide an optical fiber coating having a stuffed $\beta$ quartz structure exhibiting thermal expansion characteristics closely matching that of the silica optical fiber to which it is applied.

It is additionally an object of the present invention to provide a coating of multi-function compounds for environmentally protective coating of optical glass fiber by means of the SOL-GEL process.

The present invention combines solutions of tetraethoxysilane, nitric acid for pH control, lithium hydroxide, $Ti(OC_3H_7)_4$, $Zr(O_2C_5H_7)_4$, and glycerol to produce a glass fiber coating which is applied to the fiber by means of the SOL-GEL process and which provides environmental contaminant exclusion, resistance to ambient and operating environment insult and degradation at high temperatures above 200° C. and which is highly resistant to crack formation, flaking and propagation.

The coating of the present invention does not exhibit wide thermal expansion swings as a function of temperature. It has a stuffed $\beta$ quartz structure that exhibits thermal expansion characteristics closely matching that of the silica optical fiber to which it is applied.

DETAILED DISCUSSION

The inventor has performed work as described in the following discussion using the SOL-GEL process for development of hermetic coatings for $SiO_2$ fibers.

Despite the fact that the processes discussed in the literature provide both a variety of chemical compositions as well as adhered "hermetic" coatings, crack-free long lengths of coated $SiO_2$ have been difficult to achieve. At best, coating lengths in the prior work ranged from ½" to 1" of coated fibers having no cracks.

The following chemical composition constituting the present invention has been found by the inventor to significantly improve coating quality and provide the coating crack-related characteristics sought:

|  | Moles | Mole % in Solution | wt g. |
|---|---|---|---|
| $(C_2H_5O)_4Si$ TEOS | 1.02 | 1.02 | 2.128 |
| $(OC_4H_9)_3Al$ | 0.548 | 0.548 | 1.357 |
| LiOH | 0.273 | 0.273 | 0.07 |
| $(OC_3H_7)_4Ti$ | 0.02 | 0.02 | 0.825 |
| $(O_2C_5H_7)_4Zr$ | 0.0002 | 0.0002 | 0.075 |
| Glycerol | 0.00012 | 0.00012 | 0.011 |

The coating solution with the above ingredients was prepared as follows:

(1) Dissolve the $Al(OC_4H_9)_3$ and $(C_2H_5O)_4Si$ (tetraethoxysilane, hereinafter TEOS) in 50 ml of propanol and heat to 40° in about 2–5 minutes on the low setting of the a plate and hold temperature at 40° for ten (10) minutes while stirring.

(2) To the solution in (1) add 2 ml of concentrated $HNO_3$ to insure the pH is acidic, that is pH ≈ 1.0.

(3) A second solution containing 0.70 g of LiOH dissolved in 5 ml of $H_2O$ was next prepared.

(4) A third solution was prepared using 0.825 g of $Ti(OC_3H_7)_4$ mixed into 10 ml of propanol.

(5) A fourth solution was prepared using 0.75 g of $Zr(O_2C_5H_7)_4$ mixed into 5 ml of propanol.

(6) The Ti solution of step (4) above and the Zr solution of step (5) above were next added to the acidified Al-Si solution of step (2) above and stirred for 5 minutes while maintaining a temperature of 40° C. ±2° C. and five additional drops of $HNO_3$ were added to obtain a pH between 0 and 5.

(7) The LiOH solution was next added to the solution in step (6) above accompanied by 5 ml of $H_2O$ and 5 ml of propanol.

(8) The solution of step 7 above was stirred for 1 to 1½ hours at 40° C. while adding the glycerol dropwise to insure no precipitation of any of the metal species and that a separation of $H_2O$ and the glycerol does not occur.

Application of the coating of the present invention to optical glass specimens including fibers may be accomplished by spin or dip coating or by use of a draw tower and die extrusion, all well-known techniques.

It has been the inventor's experience that data on glass slides coated with the sol-gel system behaves very closely to freshly made $SiO_2$ fibers. Thus, coatings of the solution produced in step 8 of the above preparation were applied by a dipping process on glass slides which had been prepared by cleaning with concentrated $HNO_3$, HCL, $HCL/HNO_3$(3:1) and propanol. Coating thickness is in this case is a function of liquid viscosity, dipping rate, and number of dippings. The coated slides were heat treated to the dry state at a rate of 0.5° C./min to 100° C. and held at 100° C. for 6 to 8 hours. All slides coated with the glycerol-containing SOL-GEL solution prepared and applied in accordance with the above showed remarkable improvements over those using solutions not containing glycerol. Crack-free coatings three (3) inches long were made with the above method. This observation was made using a scanning electron microscope. The adhesion to the substrate was quite good also. Continuous attempts to scratch the surface with a sharp pen did not cause peeling or flaking of the oxide coating. This coating was amorphous (poorly crystalline) as evident of a glass like X-ray pattern.

The present invention has been described above relative to a specific embodiment. There are numerous variations of the coating mixture that may be apparent to those skilled in the art in light of the above teaching and the scope of the included claims. It is, therefore, to be understood that my invention may be practiced other than as specifically described without exceeding the scope of the claims which follow.

What is now claimed as the invention is:

1. A SOL-GEL coating composition for $SiO_2$ optical glass comprising:
    (a) $(C_2H_5O)_4Si$ (TEOS) in the amount of 2.128±0.002 grams;
    (b) $(OC_4H_9)_3Al$ in the amount of 1.357±0.002 grams;
    (c) LiOH in the amount of 0.07±0.005 grams;
    (d) $(OC_3H_7)_4Ti$ in the amount of 0.825±0.002 grams;
    (e) $(O_2C_5H_7)_4Zr$ in the amount of 0.075±0.0002 grams; and
    (f) glycerol in the amount of 0.011±0.005 grams, wherein the above ingredients are combined as follows:
        (i) dissolve the $Al(OC_4H_9)_3$ and $(C_2H_5O)_4Si$ (tetraethoxysilane, hereinafter TEOS) in 50 ml of propanol and heat to 40° C. in about 2 to 5 minutes and hold temperature at 40° C. for 5 minutes;
        (ii) to the solution in (i) add 2 ml of concentrated $HNO_3$ to insure the pH is acidic, i.e. pH≈1.0;
        (iii) a second solution containing 0.07 g of LiOH dissolved in 5 ml of $H_2O$ is next prepared;
        (iv) a third solution was prepared using 0.825 g of $Ti(OC_3H_7)_4$ mixed into 10 ml of propanol;
        (v) a fourth solution is prepared using 0.75 g of $Zr(O_2C_5H_7)_4$ mixed into 5 ml of propanol;
        (vi) the Ti solution of (iv) above and the Z solution of (v) above are next added to the acidified Al-Si solution of (ii) above and five additional drops of $HNO_3$ added to obtain a pH between 0 and 5;
        (vii) the LiOH solution is next added to the solution in (vi) above accompanied by 5 ml of $H_2O$ and 5 ml of propanol;
        (viii) the solution of (vii) above is stirred for 1 to 1½ hours at 40° C. while adding the glycerol dropwise to insure no precipitation of any of the metal species and that a separation of $H_2O$ and the glycerol does not occur.

2. The method of treating an optical glass to receive the coating of claim 1 comprising the steps of: (a) precleaning said glass with concentrated $HNO_3$, HCL $HCL/HNO_3$ (3:1) and propanol, (b) heating to the dry state at a rate of about 0.5°/min to 100° C., and (c) holding said fiber at 100° C. for about 6 to 8 hours.

3. A SOL-GEL coating composition for $SiO_2$ optical glass comprising:
    (a) $(C_2H_5O)_4Si$ (TEOS) in the amount of 2.128±0.002 grams;
    (b) $(OC_4H_9)_3Al$ in the amount of 1.357±0.002 grams;
    (c) LiOH in the amount of 0.07±0.005 grams;
    (d) $(OC_3H_7)_4Ti$ in the amount of 0.825±0.002 grams;
    (e) $(O_2C_5H_7)_4Zr$ in the amount of 0.075±0.0002 grams; and
    (f) glycerol in an effective amount so that said coating has a stuffed β quartz structure and is hermetic, highly adherent, and highly resistant to crack formation and propagation, and has thermal expansion characteristics closely matching those of the optical glass to which it is applied.

4. The coating composition of claim 3 wherein the amounts of $(OC_3H_7)_4Ti$ and $(O_2C_5H_7)_4Zr$ are variable relative to and proportional to each other while maintaining said stuffed β quartz structure and hermetic condition.

5. A SOL-GEL coating composition for $SiO_2$ optical glass comprising:
    (a) $(C_2H_5O)_4Si$ (TEOS) in the amount of 1.02 moles;
    (b) $(OC_4H_9)_3Al$ in the amount of 0.548 mole;
    (c) LiOH in the amount of 0.273 mole;
    (d) $(OC_3H_7)_4Ti$ in the amount of 0.02 mole;
    (e) $(O_2C_5H_7)_4Zr$ in the amount of 0.0002 mole; and
    (f) glycerol in an effective amount so that said coating has a stuffed β quartz structure and is hermetic, highly adherent, and highly resistant to crack formation and propagation, and has thermal expansion characteristics closely matching those of the optical glass to which it is applied.

6. The coating composition of claim 5 wherein said glycerol is in an amount of about 0.00012 mole.

* * * * *